UNITED STATES PATENT OFFICE.

RAY. BLAKISTON AND WILLIAM C. BLAKISTON, OF QUEBEC, CANADA.

IMPROVEMENT IN WAXING COMPOSITIONS.

Specification forming part of Letters Patent No. 179,759, dated July 11, 1876; application filed May 2, 1876.

*To all whom it may concern:*

Be it known that we, RAY. BLAKISTON and WILLIAM COMPTON BLAKISTON, of the city of Quebec, in the Province of Quebec, in the Dominion of Canada, have invented a new and useful Waxing Compound or Composition, of which the following is a specification:

This invention relates to that class of compounds used to wax soft cording and all descriptions of twines made from jute, flax, cotton, or hemp.

To prepare this compound, take of bees-wax three parts; of rosin, five and a half parts; and of palm oil, one and a half parts. Dissolve the rosin and wax together in an ordinary kettle on a stove or furnace; when dissolved, add the palm-oil in a crude state, which must be done gradually and carefully, to avoid scattering of mixture. When the ingredients are thoroughly mixed in the proportions stated, the mixture is ready for use.

To prepare said twines, the material above described is placed in a machine made for the purpose (and for which a patent was granted to us April 18, 1876, No. 176,269).

We claim—

A compound consisting of bees-wax, rosin, and palm-oil, in the proportions above stated, substantially as and for the purpose specified.

RAY. BLAKISTON.
    WM. C. BLAKISTON.

Witnesses:
 N. A. COOK,
 P. C. MURPHY.